United States Patent
Liu et al.

(10) Patent No.: US 9,424,842 B2
(45) Date of Patent: Aug. 23, 2016

(54) SPEECH RECOGNITION SYSTEM INCLUDING AN IMAGE CAPTURING DEVICE AND ORAL CAVITY TONGUE DETECTING DEVICE, SPEECH RECOGNITION DEVICE, AND METHOD FOR SPEECH RECOGNITION

(71) Applicants: Ching-Feng Liu, Kaohsiung (TW); Hsiao-Han Chen, Tainan (TW)

(72) Inventors: Ching-Feng Liu, Kaohsiung (TW); Hsiao-Han Chen, Tainan (TW)

( * ) Notice: Subject to any disclaimer, the term of this patent is extended or adjusted under 35 U.S.C. 154(b) by 0 days.

(21) Appl. No.: 14/809,739

(22) Filed: Jul. 27, 2015

(65) Prior Publication Data
US 2016/0027441 A1   Jan. 28, 2016

(30) Foreign Application Priority Data

Jul. 28, 2014 (TW) .............................. 103125713 A
Mar. 24, 2015 (TW) .............................. 104109414 A

(51) Int. Cl.
*G10L 15/25* (2013.01)
*G10L 15/08* (2006.01)
*G10L 15/24* (2013.01)
*G10L 21/10* (2013.01)

(52) U.S. Cl.
CPC ................. *G10L 15/25* (2013.01); *G10L 15/08* (2013.01); *G10L 15/24* (2013.01); *G10L 2021/105* (2013.01)

(58) Field of Classification Search
CPC combination set(s) only.
See application file for complete search history.

(56) References Cited

U.S. PATENT DOCUMENTS

| | | | | |
|---|---|---|---|---|
| 4,303,077 A * | 12/1981 | Lewin | .................. | A61B 5/1114 433/69 |
| 4,334,542 A * | 6/1982 | Takinishi | ............... | G09B 19/06 434/185 |
| 5,523,745 A * | 6/1996 | Fortune | ..................... | A61F 4/00 340/4.12 |
| 5,689,246 A * | 11/1997 | Dordick | ................... | H01H 3/14 340/4.11 |
| 6,598,006 B1 * | 7/2003 | Honda | ....................... | A61F 4/00 340/4.11 |
| 7,071,844 B1 * | 7/2006 | Moise | ................. | G06F 3/03547 340/4.11 |
| 7,890,193 B2 * | 2/2011 | Tingey | ............... | A61N 1/36014 607/134 |
| 9,129,595 B2 * | 9/2015 | Russell | ...................... | A61F 2/20 |
| 2004/0243416 A1 * | 12/2004 | Gardos | ................... | G10L 15/25 704/275 |
| 2013/0090931 A1 * | 4/2013 | Ghovanloo | ............. | G06F 3/011 704/275 |
| 2014/0342324 A1 * | 11/2014 | Ghovanloo | ............ | G09B 19/04 434/185 |

\* cited by examiner

*Primary Examiner* — Barbara Reinier
(74) *Attorney, Agent, or Firm* — Muncy, Geissler, Olds & Lowe, P.C.

(57) ABSTRACT

A speech recognition system is to be used on a human subject. The speech recognition system includes an image capturing device, an oral cavity detecting device and a speech recognition device. The image capturing device captures images of lips of the subject during a speech of the subject. The oral cavity detecting device detects contact with a tongue of the subject and distance from the tongue of the subject, and accordingly generates a contact signal and a distance signal. The speech recognition device processes the images of the lips and the contact and distance signals so as to obtain content of the speech of the subject.

19 Claims, 10 Drawing Sheets

SPEECH RECOGNITION SYSTEM INCLUDING AN IMAGE CAPTURING DEVICE AND ORAL CAVITY TONGUE DETECTING DEVICE, SPEECH RECOGNITION DEVICE, AND METHOD FOR SPEECH RECOGNITION

CROSS-REFERENCE TO RELATED APPLICATION

This application claims priorities of Taiwanese Application No. 103125713, filed on Jul. 28, 2014, and Taiwanese Application No. 104109414, filed on Mar. 24, 2015.

FIELD

The disclosure relates to a speech recognition system, a speech recognition device, and a method for speech recognition.

BACKGROUND

Human speech is a result of the coordination among many systems of the human body, including respiratory system, articulation system, and various associated muscles and neurons. Damages to the neurons associated with those systems may result in impairment of functionalities of the systems, and difficulty in normal pronunciations, leading to unintelligible speech. Such a condition of unintelligible speech is commonly referred to as dysarthria.

It is noted that a person with the dysarthria condition usually does not have problem understanding cognitive language, and his/her attempted pronunciations of a particular word remain generally consistent.

SUMMARY

Therefore, an object of the disclosure is to provide a speech recognition system for a person with dysarthria.

According to the disclosure, the speech recognition system is to be used on a human subject. The speech recognition system includes an image capturing device, an oral cavity detecting device and a speech recognition device.

The image capturing device is for successively capturing images of lips of the subject during a speech of the subject. The oral cavity detecting device includes a carrier base, a contact detecting unit and a distance detecting unit.

The carrier base is configured to be mounted in an oral cavity of the subject at a palate of the subject. The contact detecting unit is disposed on the carrier base, and is configured to detect contact with a tongue of the subject and to generate a contact signal according to the contact with the tongue during the speech of the subject. The distance detecting unit is disposed on the carrier base, and is configured to detect a distance from the tongue of the subject and to generate a distance signal according to the distance from the tongue.

The speech recognition device is coupled to the image capturing device and the oral cavity detecting device for respectively receiving the images of the lips of the subject and the contact and distance signals. The speech recognition device is programmed to process the images of the lips and the contact and distance signals so as to obtain content of the speech of the subject.

Another object of the disclosure is to provide a speech recognition device that can perform the speech recognition process.

According to the disclosure, the speech recognition device is to be coupled to an image capturing device for receiving images of the lips of a human subject during a speech of the subject therefrom. The speech recognition device is further to be coupled to an oral cavity detecting device for receiving a contact signal and a distance signal. The contact signal is associated with contact of the oral cavity detecting device with the tongue of the subject during the speech of the subject, and the distance signal is associated with a distance of the oral cavity detecting device from the tongue during the speech of the subject. The speech recognition device includes a lip movement analyzing module, a contact analyzing module, a distance analyzing module, and a parameter collecting module.

The lip movement analyzing module stores a plurality of lip parameters associated respectively with different movements of the lips therein. The lip movement analyzing module is programmed to analyze the images of the lips for determining which one of the movements of the lips occurs during the speech of the subject, and to obtain a corresponding one of the lip parameters that is associated with the one of the movements of the lips.

The contact analyzing module stores a plurality of palate parameters associated respectively with patterns of the contact with the tongue therein. The contact analyzing module is programmed to analyze the contact signal for determining which one of the patterns occurs during the speech, and to obtain a corresponding one of the palate parameters that is associated with the one of the patterns.

The distance analyzing module stores a plurality of tongue parameters associated respectively with change patterns of the distance between the distance detecting unit and the tongue of the subject therein. The distance analyzing module is programmed to analyze the distance signal for determining which one of the change patterns of the distance occurs during the speech, and to obtain a corresponding one of the tongue parameters associated the one of the change patterns of the distance.

The parameter collecting module is programmed to collect the corresponding one of the lip parameters, the corresponding one of the palate parameters and the corresponding one of the tongue parameters to generate a speech parameter set corresponding to content of the speech.

Yet another object of the disclosure is to provide a method to be implemented using the speech recognition device as described above.

According to the disclosure, the method includes the steps of:

successively obtaining, by the image capturing device, images of lips of the subject during a speech of the subject;

detecting, by the oral cavity detecting device, contact with a tongue of the subject and generating a contact signal according to the contact with the tongue during the speech of the subject;

detecting, by the oral cavity detecting device, a distance from the tongue of the subject and generating a distance signal according to the distance from the tongue;

receiving, by the speech recognition device, the image of lips of the subject from the image capturing device and the contact and distance signals from the oral cavity detecting device; and processing, by the speech recognition device, the images of the lips and the contact and distance signals so as to obtain content of the speech of the subject.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
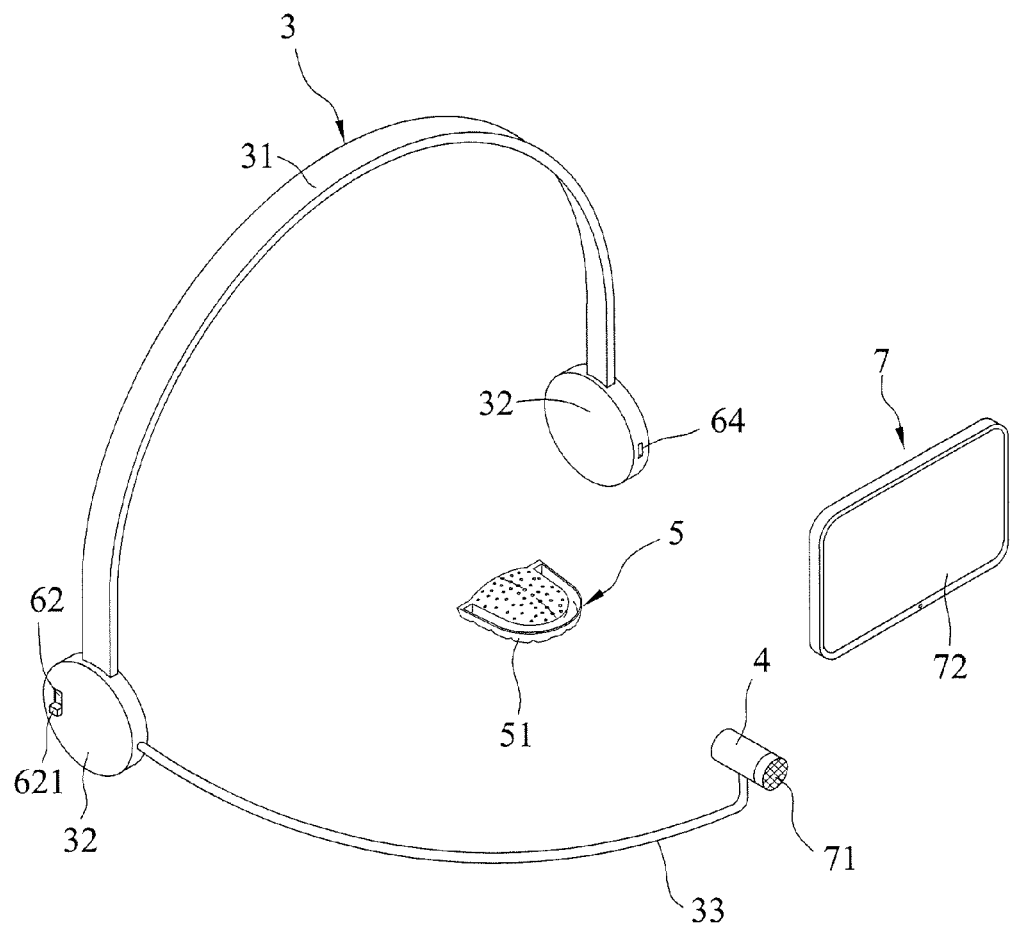
FIG. 1 illustrates a speech recognition system according to the first embodiment of the disclosure.

Before the disclosure is described in greater detail, it should be noted that like elements are denoted by the same reference numerals throughout the disclosure.

FIG. 1 illustrates a speech recognition system according to the first embodiment of the disclosure. The speech recognition system is to be used on a human subject 900 (as shown in FIG. 2) who may have the dysarthria condition.

The speech recognition system includes a wearable accessory 3, an image capturing device 4, an oral cavity detecting device 5, a speech recognition device 6 (see FIG. 3) and an output device 7.

Figure 2:
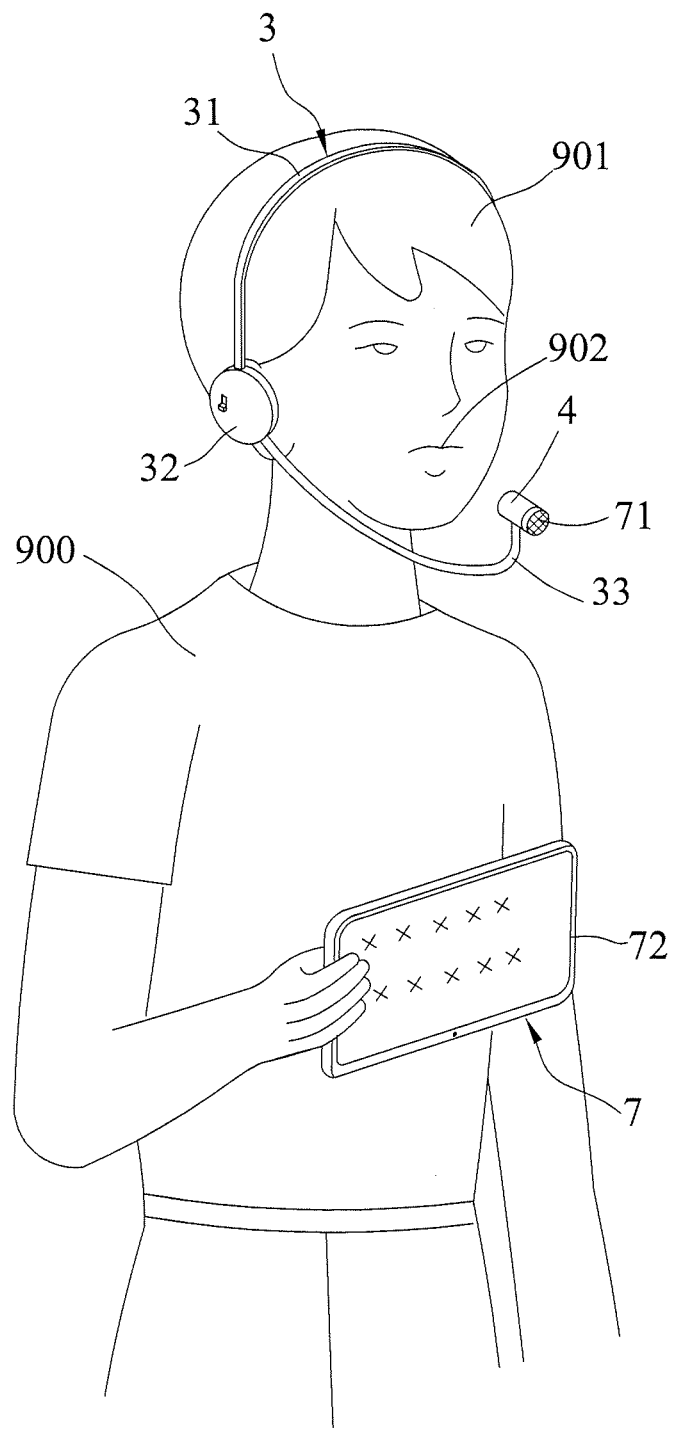
FIG. 2 illustrates a human subject wearing the speech recognition system of FIG. 1.

Further referring to FIG. 2, in this embodiment of the speech recognition system, the wearable accessory 3 includes a main part 31, a pair of connecting parts 32 and an extension part 33. The main part 31 is C-shaped and is to be worn by the subject 900 on his/her head 901. The connecting parts 32 are disposed on respective ends of the main part 31. The extension part 33 is connected to one of the connecting parts 32, extends forwardly therefrom, and is made of a flexible material. Moreover, the extension part 33 encloses a cable wire (not depicted in the drawings) for transmitting data.

It is noted that, while in this embodiment the wearable accessory 3 is embodied in the form of a pair of earmuffs, in other embodiments the wearable accessory 3 may be embodied in the form of a piece of eyewear. In other embodiments, the wearable accessory 3 may include only one connecting part 32.

The image capturing device 4 is disposed on a free end of the extension part 33 (i.e., the end that is not connected to the one of the connecting parts 32), and is configured for successively capturing images of lips 902 of the subject 900 during a speech of the subject 900. The extension part 33 may be adjusted in order to place the image capturing device 4 at a proper location, for example, at a location right in front of the lips 902 of the subject 900. The images captured by the image capturing device 4 may be then transmitted via the cable wire in the extension part 33.

Figure 3:
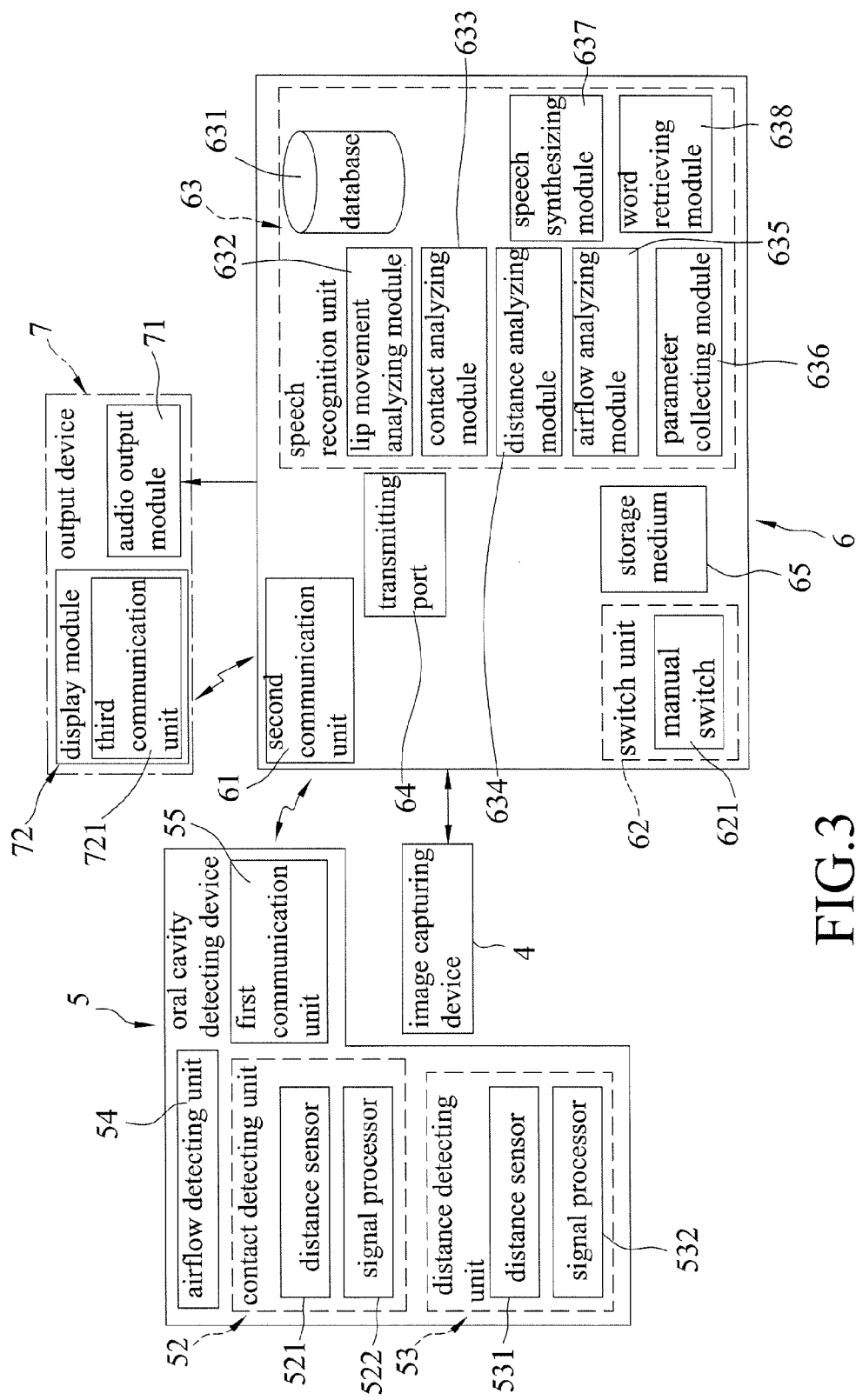
FIG. 3 is a block diagram of the speech recognition system of the first embodiment.
Figure 4:
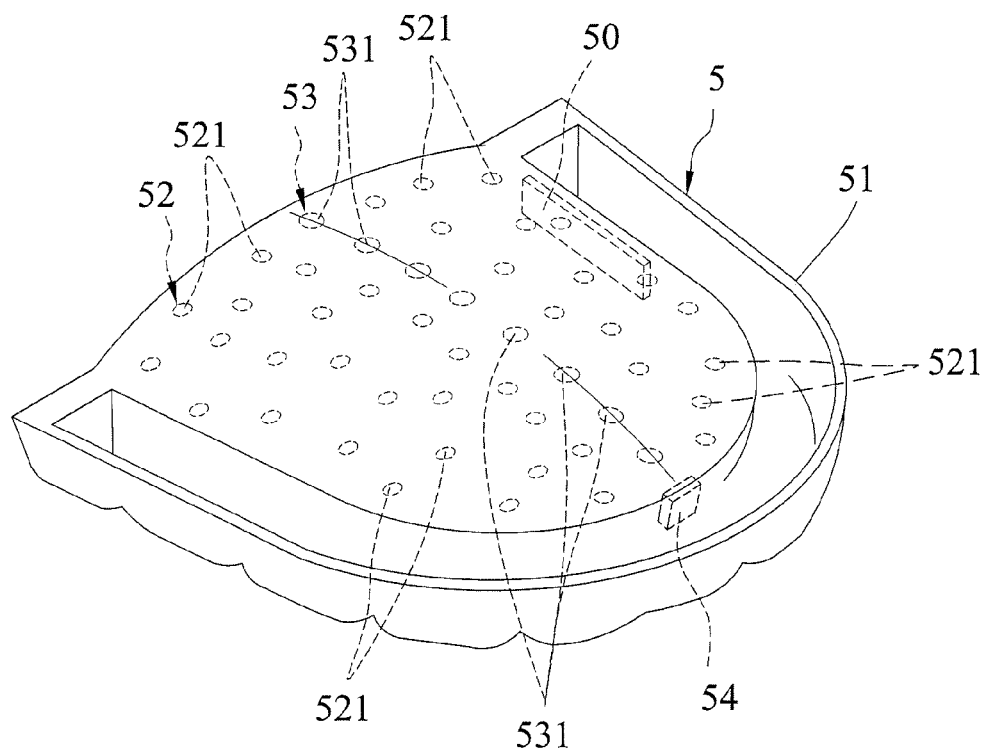
FIG. 4 illustrates an oral cavity detecting device of the speech recognition system.
Figure 5:
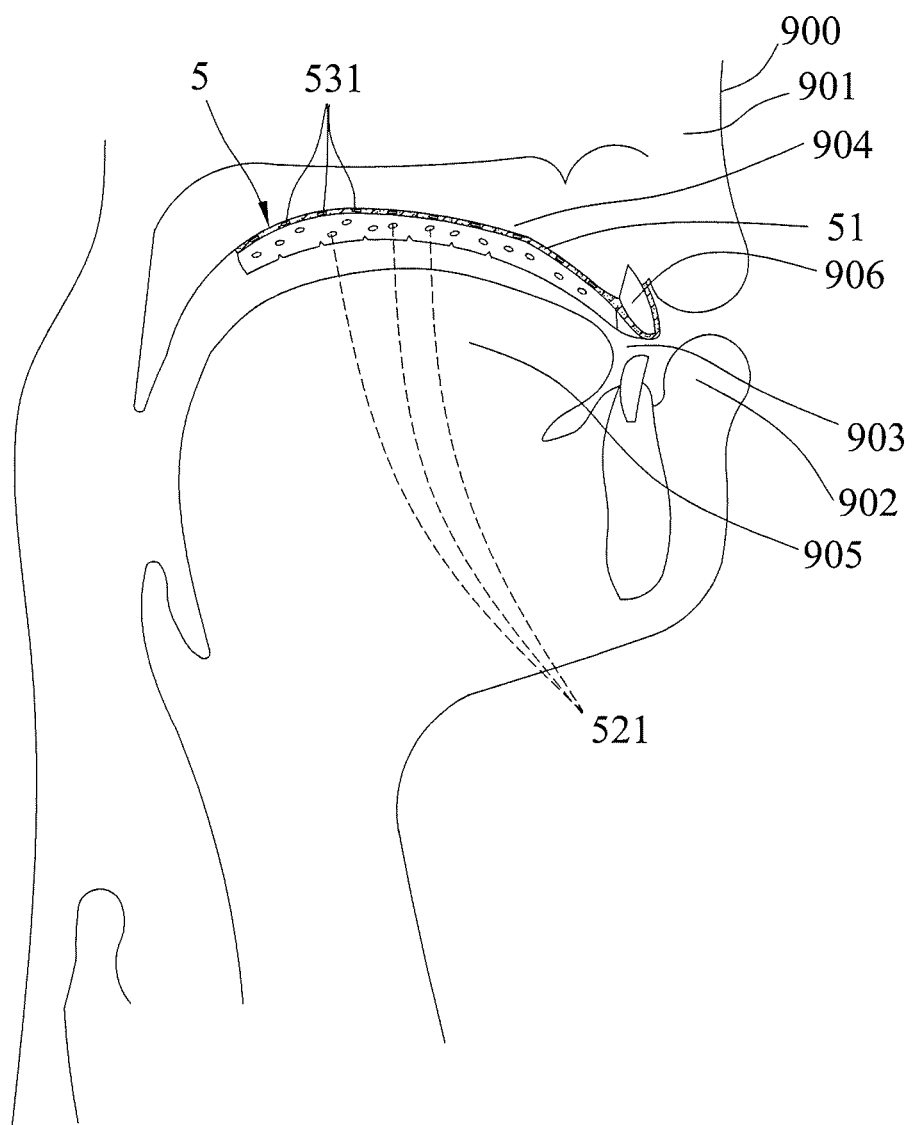
FIG. 5 illustrates the oral cavity detecting device being placed in an oral cavity of the subject.

Referring to FIGS. 3 to 5, the oral cavity detecting device 5 includes a carrier base 51, a contact detecting unit 52, a distance detecting unit 53, an airflow detecting unit 54 and a first communication unit 55.

The carrier base 51 is shaped to fit with a palate 904 and top teeth 906 of the subject 900. Specifically, when mounted in an oral cavity 903 of the subject 900, the carrier base 51 engages the top teeth 906 of the subject 900, and is able to abut against the palate 904. Additional components such as adhesive and/or a positioning component may be employed to secure the carrier base 51. As such, the carrier base 51 serves as a "replacement" of the palate 904 and the top teeth 906 of the subject 900 during the speech of the subject 900.

The contact detecting unit 52 is disposed on the carrier base 51, and is configured to detect contact with a tongue 905 of the subject 900 and to generate a contact signal according to the contact with the tongue 905 during the speech of the subject 900. The contact detecting unit 52 includes a plurality of spaced-apart pressure sensors 521 (only one is depicted in FIG. 3 for the sake of simplicity) and a signal processor 522.

In this embodiment, the pressure sensors 521 are disposed on a bottom surface of the carrier base 51, which faces the tongue 905 when said carrier base 51 is mounted to the palate 904 of the subject 900. It is noted that, in other embodiments, the pressure sensors 521 may be embedded in the carrier base 51.

In use, the pressure sensors 521 are configured to respectively output pressure detecting signals upon being touched by the tongue 905. The pressure detecting signal from each of the pressure sensors 521 may include data such as numbers of times of contact with the tongue 905, and a magnitude of pressure resulting from the contact with the tongue 905.

The signal processor 522 is configured to process the pressure detecting signals to generate a contact signal, according to the contact with the tongue 905 during the speech of the subject 900. The contact signal includes the magnitude of the pressure detected by each of the pressure sensors 521, the number of times that each of the pressure sensors 521 detects a contact with the tongue 905, and receipt order of the pressure detecting signals from the pressure sensors 521 (i.e., the order of the pressure sensors 521 touched by the tongue 905). Accordingly, since the carrier base 51 provided with the contact detecting unit 52 serves as the replacement of the palate 904 and the top teeth 906, the contact signal can indicate movement of the tongue 905 related to the palate 904 and the top teeth 906 during the speech of the subject 900, such as a pattern of contact between the tongue 905 and the palate 904/top teeth 906, positions of the contact, and contact force.

The distance detecting unit 53 is disposed on the carrier base 51, and is configured to detect a distance from the tongue 905 of the subject 900 and to generate a distance signal according to the distance from the tongue 905. The distance detecting unit 53 includes a plurality of spaced-apart distance sensors 531 (only one is depicted in FIG. 3 for the sake of simplicity), and a signal processor 532.

The distance sensors 531 are disposed on the bottom surface of the carrier base 51 and are aligned along a central line of the carrier base 51; that is to say, the distance sensors 531 are arranged along a front-rear direction of the tongue 905 when the carrier base 51 is mounted at the palate 904 of the subject 900. The distance sensors 531 are configured to detect distances from the tongue 905 and to output distance detecting signals, respectively.

In use, each of the distance sensors 531 is able to send a probing signal (e.g., a light signal) toward the tongue 905, and to output a distance detecting signal according to the probing signal reflected by the tongue 905. Using the distance detecting signals outputted by the distance sensors 531, the signal processor 532 is then able to determine distances between the respective distance sensors 531 and the tongue 905 during the speech of the subject 900, and generate the distance signal accordingly. Similarly, the distance signal can indicate a change pattern of the distance between the palate 904 and the tongue 905 during the speech since the carrier base 51 provided with the distance detecting unit 53 serves as the replacement of the palate 904.

The airflow detecting unit 54 is disposed on a front portion of the carrier base 51, and is exposed in the oral cavity 903 when the carrier base 51 is mounted at the palate 904 of the subject 900. The airflow detecting unit 54 is for detecting airflow inside the oral cavity 903 of the subject 900 during the speech of the subject 900, and is configured to generate an airflow signal accordingly.

The first communication unit 55 is coupled to the speech recognition device 6 wirelessly, in order to transmit the signals generated by the contact detecting unit 52, the distance detecting unit 53, and the airflow detecting unit 54 to the speech recognition device 6. Data transmission between the first communication unit 55 and the speech recognition device 6 may be performed using the ANT+ protocol, Bluetooth®, ZigBee®, near field communication (NFC), etc.

In this embodiment, the first communication unit 55 and the signal processors 522 and 532 are integrated on a circuit board 50 embedded in the carrier base 51.

Referring to FIGS. 1 to 3, the speech recognition device 6 is installed in the wearable accessory 3, and includes a second communication unit 61, a switch unit 62, a speech recognition unit 63, a transmitting port 64 and a storage medium 65.

The second communication unit 61 is able to communicate with the first communication unit 55. That is, the second communication unit 61 is able to receive the contact signal, the distance signal and the airflow signal generated respectively by the contact detecting unit 52, the distance detecting unit 53 and the airflow detecting unit 54. The second communication unit 61 is further coupled to the image capturing device 4 using, for example, a transmission cable, for receiving the images of the lips 902. The received data is then stored in the storage medium 65.

The switch unit 62 includes a manual switch 621. When the manual switch 621 is turned on, an activation command is transmitted to the image capturing device 4 and the oral cavity detecting device 5 for activating the same to obtain the images of the lips 902 of the subject 900, the contact signal, the distance signal and the airflow signal.

The speech recognition unit 63 includes a database 631, a lip movement analyzing module 632, a contact analyzing module 633, a distance analyzing module 634, an airflow analyzing module 635, a parameter collecting module 636, a speech synthesizing module 637, and a word retrieving module 638.

The database 631 stores a plurality of speech parameter sets, a plurality of pronunciation data sets respectively associated with the speech parameter sets, and a plurality of word data sets each associated with a specific combination of at least one of the pronunciation data sets.

In this embodiment, a particular one of the pronunciation data sets is associated with a particular syllable, which is a unit of speech sounds. A particular one of the word data sets is associated with a word, which is a specific combination of one or more syllables.

The lip movement analyzing module 632 stores a plurality of lip parameters associated respectively with different movements of the lips 902. The lip movement analyzing module 632 is programmed to analyze the images of the lips 902 for determining which one of the movements of the lips 902 occurs during the speech of the subject 900, and to obtain a corresponding one of the lip parameters that is associated with the one of the movements of the lips 902.

The contact analyzing module 633 stores a plurality of palate parameters associated respectively with different patterns of the contact with the tongue 905. The contact analyzing module 633 is programmed to analyze the contact signal for determining which one of the patterns of the contact with the tongue 905 occurs during the speech, and to obtain a corresponding one of the palate parameters that is associated with said one of the patterns of the contact.

The distance analyzing module 634 stores a plurality of tongue parameters. The tongue parameters are associated respectively with different change patterns of the distance between the distance detecting unit 53 and the tongue 905 of the subject 900 (i.e., the distance between the palate 904 and the tongue 905). The distance analyzing module 634 is programmed to analyze the distance signal for determining which one of the change patterns of the distance occurs during the speech, and to obtain a corresponding one of the tongue parameters associated with the one of the change patterns of the distance.

The airflow analyzing module 635 stores a plurality of airflow parameters associated respectively with different change patterns of airflow inside the oral cavity 903 of the subject 900. The airflow analyzing module 635 is programmed to analyze the airflow signal for determining occurs one of the change patterns of the airflow occurs inside the oral cavity 903 during the speech, and to obtain a corresponding one of the airflow parameters associated with the one of the change patterns of the airflow.

The parameter collecting module 636 is programmed to collect the lip parameter, the palate parameter, the tongue parameter and the airflow parameter obtained respectively by the lip movement analyzing module 632, the contact analyzing module 633, the distance analyzing module 634 and the airflow analyzing module 635, so as to generate a speech parameter set corresponding to the content of the speech accordingly.

The speech synthesizing module 637 is programmed to compare the speech parameter set generated by the parameter collecting module 636 with each of the speech parameter sets stored in the database 631, to obtain one of the pronunciation data sets that is associated with one of the speech parameter sets conforming with the speech parameter set generated by the parameter collecting module 636, to generate a synthesized pronunciation signal at least from the obtained one of the pronunciation data sets, and to transmit the synthesized pronunciation signal to the output device 7. The synthesized pronunciation signal is then stored in the storage medium 65.

In generating the synthesized pronunciation signal, the speech synthesizing module 637 treats each of the pronunciation data sets as a syllable and to synthesize the pronunciation of at least one word using the syllable(s). In other embodiments, various methods may be employed, such as concatenative synthesis, formant synthesis, diphone synthesis, domain-specific synthesis, sine wave synthesis, etc.

It is noted that in cases where none of the speech parameter sets stored in the database 631 conforms with the speech parameter set generated by the parameter collecting module 636, the speech synthesizing module 637 generates a notifying signal to notify the subject 900.

The word retrieving module 638 is programmed to retrieve one of the word data sets that is associated with the pronunciation data set used for generating the synthesized pronunciation signal, and to transmit the one of the word data sets to the output device 7 via the second communication unit 61 for output.

The word retrieving module 638 may further include semantic analysis functionalities, in order to increase accuracy on retrieving the word data sets.

The transmitting port 64 may include a micro universal serial bus (USB) port that allows a wired connection to an electronic device (not depicted in the drawings) such as a tablet computer, a smartphone, a laptop computer, a personal computer, etc. When connected, the transmitting port 64 provides an interface for the electronic device to modify the settings of the speech recognition device 6 and/or access the data stored in the storage medium 65.

The output device 7 includes an audio output module 71 for outputting the synthesized pronunciation signal, and a display module 72 for displaying a word according to the word data sets received from the speech recognition device 6.

As shown in FIG. 2, in this embodiment, the audio output module 71 is embodied using a microphone disposed on the free end of the extension part 33, and is coupled to the speech recognition device 6 via the cable wire in the extension part 33 for receiving the synthesized pronunciation signal from the speech recognition device 6.

The display module 72 is embodied using a tablet computer that includes a display screen and that can be handled by the subject 900. The display module 72 further includes a third communication unit 721 for communicating wirelessly with the second communication unit 61, in order to receive the word data sets retrieved by the word retrieving module 638.

Prior to the actual use of the speech recognition system by the subject 900, a setup process is performed first.

In the setup process, the wearable accessory 3 is first placed on the head 901 of the subject 900. The extension part 33 is then adjusted so that the image capturing device 4 is able to capture images of the lips 902 of the subject 900. The carrier base 51 of the oral cavity detecting device 5 is placed in the oral cavity 903 of the subject 900.

Afterward, the subject 900 is required to speak a number of particular words while wearing the speech recognition system. The speech recognition system is then able to analyze and record, while the subject 900 speaks each of the words, speech information including the lip movements, the patterns of the contact of the pressure sensors 521 with the tongue 905, the change patterns of the distance between the distance sensors 531 and the tongue 905, and the airflow inside the oral cavity 903. The analysis in the setup process is similar to the above description, and the related parameters are stored in corresponding modules 632-635 of the speech recognition unit 63.

The recorded information is then used in establishing a speech parameter set to be associated with a particular syllable that composes the word spoken by the subject 900. The speech parameter set is then stored in the database 631, completing the setup process.

In actual use of the speech recognition system (that is, the subject 900 intends to orally convey a message), the subject 900, who is wearing the wearable accessory 3 and the oral cavity detecting device 5, may turn on the manual switch 621. In response, the second communication unit 61 transmits the activation command to the image capturing device 4 and the oral cavity detecting device 5 for activating the same.

During speech of the subject 900, the image capturing device 4 and the oral cavity detecting device 5 obtain the speech information in a manner similar to that in the setup process. As a result, the parameter collecting module 638 of the speech recognition unit 63 is capable of generating the speech parameter set corresponding to the content of the speech, and the output device 7 is capable of outputting the synthesized pronunciation signal and/or the word data sets associated with the speech parameter set.

In the case that no speech parameter set stored in the database 631 corresponds to the content of the speech, the output device 7 may be controlled by the speech recognition unit 63 to output a notification to the subject 900, and to instruct him/her to speak again for recognization.

After the message is spoken, the subject 900 may turn off the manual switch 621 for deactivating the image capturing device 4 and the oral cavity detecting device 5.

In this embodiment, the audio output module 71 is placed near the mouth of the subject 900. In an alternative embodiment, the audio output module 71 may be integrated with the display module 72.

In an alternative embodiment, one of the audio output module 71 and the display module 72 may be omitted, since only one of the audio output module 71 and the display module 72 is generally sufficient for conveying the message to others.

The inclusion of the airflow detecting unit 54 in this embodiment is for achieving a better accuracy in obtaining the pronunciation data sets and in adjusting a volume at which the audio output module 71 outputs the synthesized pronunciation signal. That is, in an alternative embodiment, the airflow detecting unit 54 may be omitted.

Figure 6:
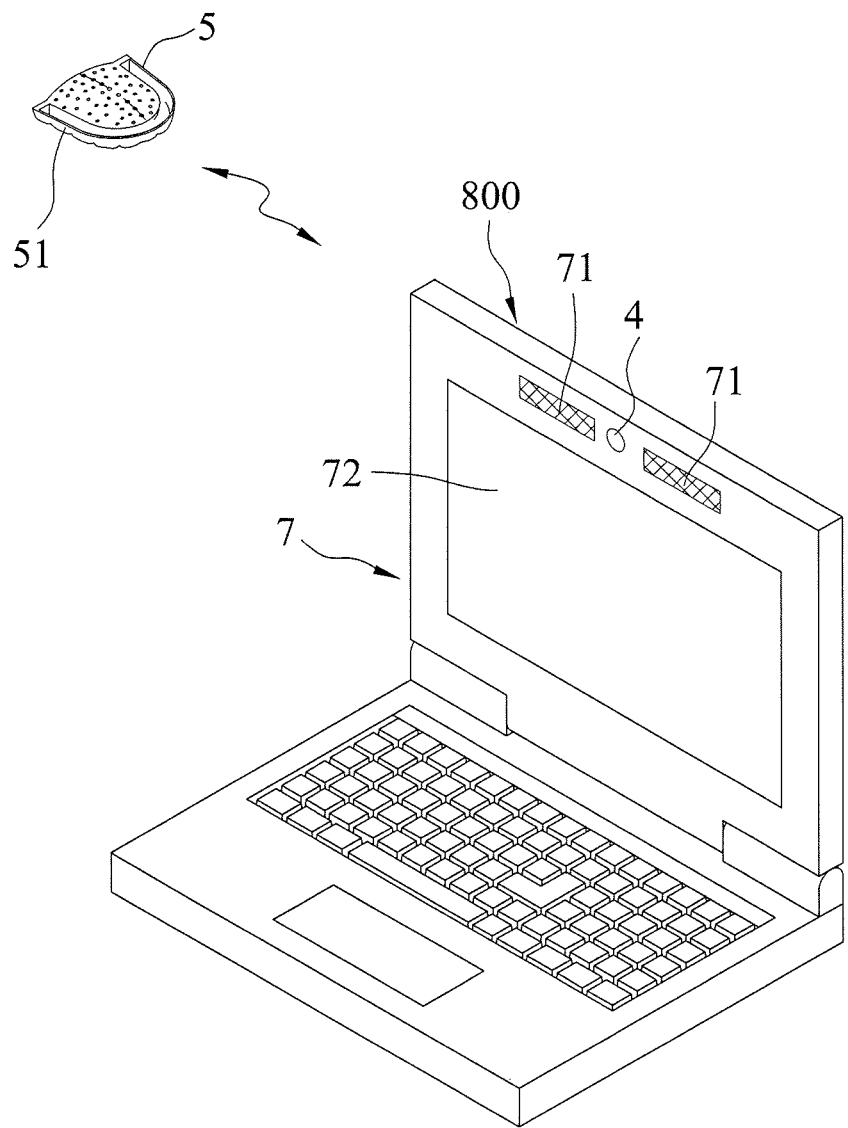
FIG. 6 illustrates a speech recognition system according to the second embodiment of the disclosure.
Figure 7:
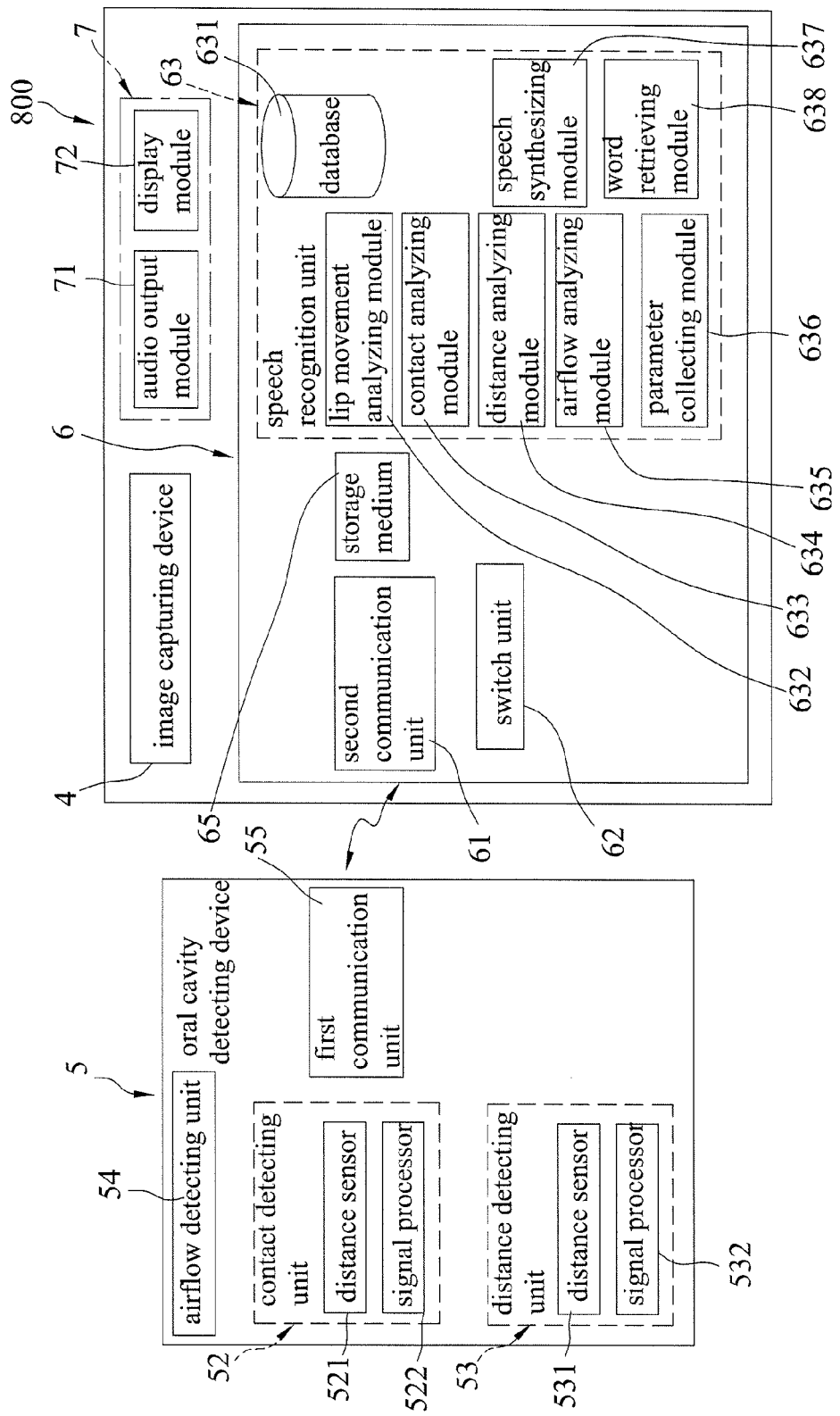
FIG. 7 is a block diagram of the speech recognition system of the second embodiment.

FIGS. 6 and 7 illustrate a second embodiment of a speech recognition system according to the disclosure. In this embodiment, the wearable accessory 3 (see FIG. 2) is omitted, and the image capturing device 4, the speech recognition device 6 and the output device 7 are integrated in an electronic device 800 (e.g., a laptop computer in this embodiment). Specifically, the built-in camera, the central processing unit (CPU) that executes an application program, the built-in sound output device and the screen of the laptop computer serve as the image capturing device 4, the speech recognition device 6, and the audio output module 71, the display module 72, respectively.

In use, when facing the electronic device 800, the lip movements of the subject 900 (see FIG. 2) may be captured by the built-in camera of the electronic device 800, and the synthesized pronunciation signal may be outputted by the built-in sound output device. As a result, the subject 900 does not have to wear the wearable accessory 3, and the effect of the first embodiment may still be achieved.

This embodiment may be useful in applications involving a remote conversation using the electronic device 800.

Figure 8:
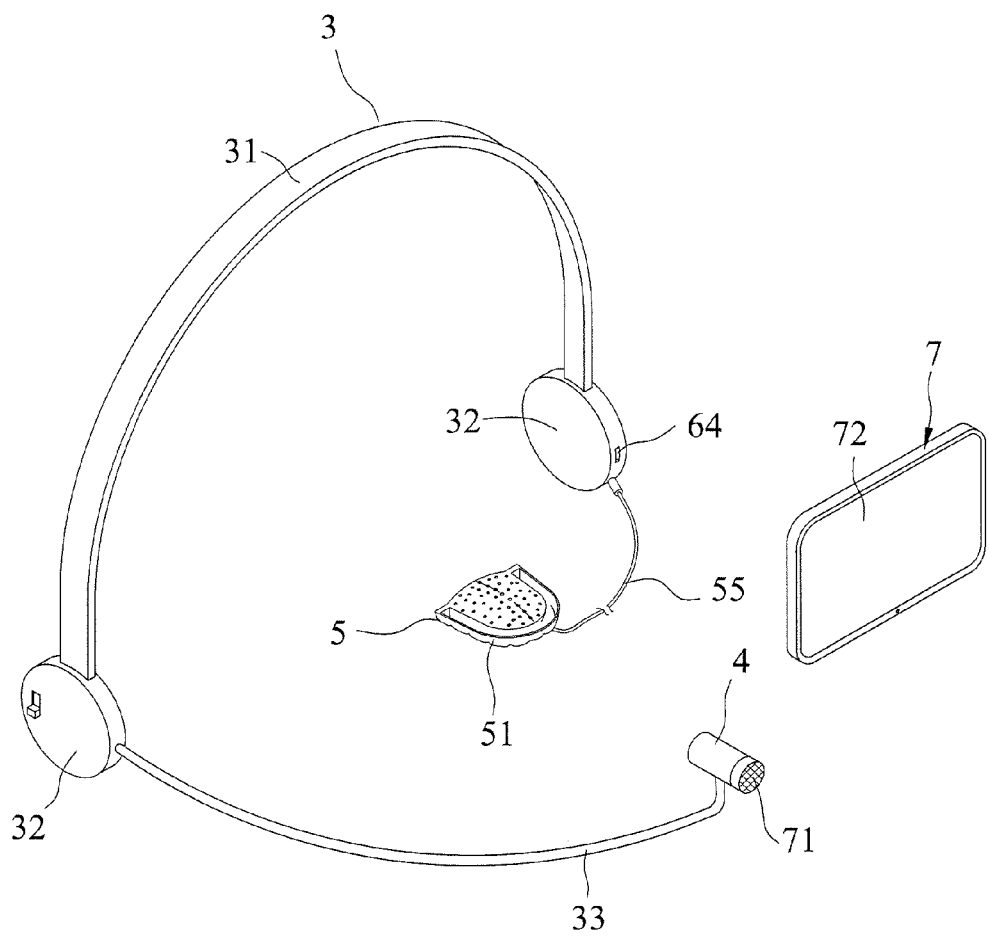
FIG. 8 illustrates a speech recognition system according to the third embodiment of the disclosure.
Figure 9:
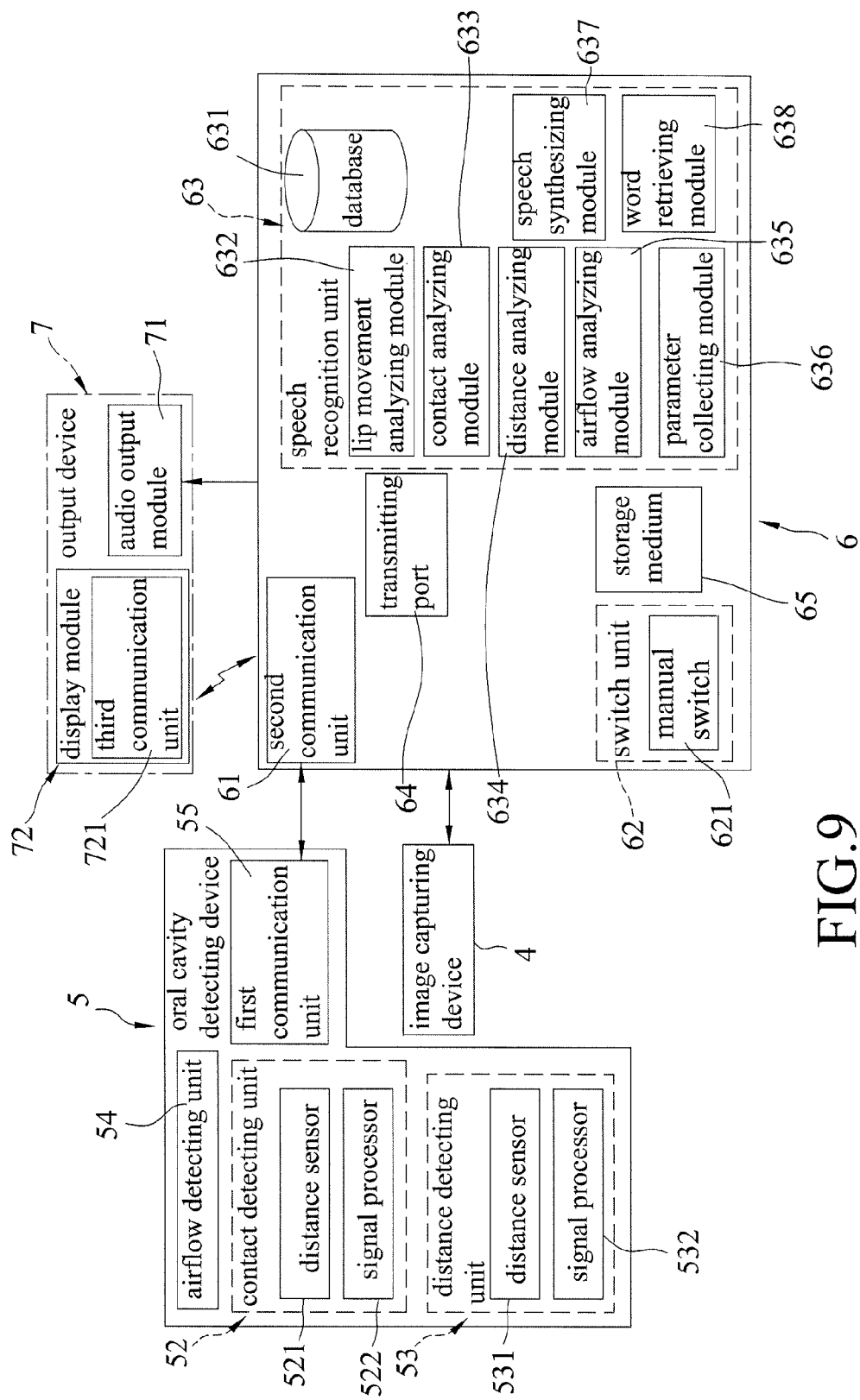
FIG. 9 is a block diagram of the speech recognition system of the third embodiment.

FIGS. 8 and 9 illustrate a third embodiment of a speech recognition system according to the disclosure. In this embodiment, the first communication unit 55 is embodied using a wire that physically connects the carrier base 51 to the second communication unit 61.

In such a case, the components that are for processing signals, such as the signal processors 522 and 532, may be disposed in the wearable accessory 3 instead of the carrier base 51. The signals generated by the pressure sensors 521 (only one is depicted in FIG. 9) and the distance sensors 531 (only one is depicted in FIG. 9) are transmitted via the first communication unit 55 to the signal processors 522 and 532 for processing. As a result, the size of the carrier base 51 may be made smaller due to the reduced number of the components incorporated therein.

Figure 10:
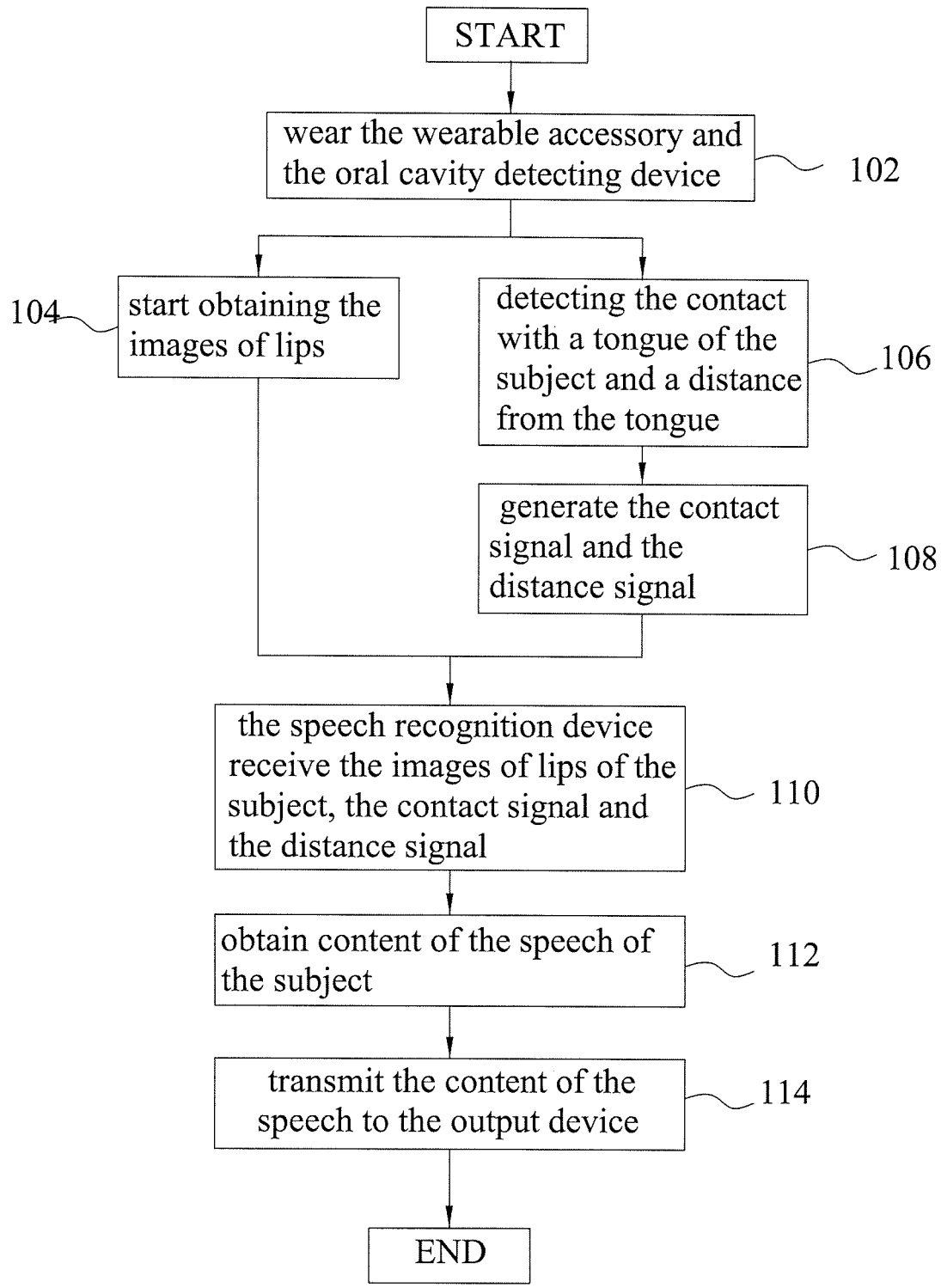
FIG. 10 is a flow chart illustrating steps of a method for speech recognition, to be implemented by the speech recognition system of the first embodiment.

As shown in FIG. 10, according to an embodiment, steps of a method for speech recognition implemented by the speech recognition system is described. For this embodiment, the speech recognition system according to the first embodiment is used.

With further reference to FIG. 2, in step 102, the components of the speech recognition system, namely the wearable accessory 3 and the oral cavity detecting device 5, are wore by the subject 900 who turns on the manual switch 621.

Afterward, the image capturing device 4 starts obtaining the images of lips 902 of the subject 900 successively in step 104, the oral cavity detecting device 5 starts detecting the contact with a tongue 905 of the subject 900 and the distance from the tongue 905 of the subject 900 in step 106 during which time the subject 900 may start a speech.

In step 108, the oral cavity detecting device 5 generates the contact signal according to the contact with the tongue 905 during the speech of the subject 900, and the distance signal according to the distance from the tongue 905.

In step 110, the speech recognition device 6 receives the images of lips 902 of the subject 900 from the image capturing device 4, and receives the contact signal and the distance signal from the oral cavity detecting device 5.

In step 112, the speech recognition device 6 processes the images of the lips 902 and the contact and distance signals, so as to obtain content of the speech of the subject 900.

In step 114, the content of the speech of the subject 900 is transmitted to the output device 7 for output.

To sum up, the speech recognition system and the method as described in the disclosure are configured to first record the necessary information regarding the speech of the subject 900 in order to generate a database that includes the speech parameter sets, the pronunciation data sets and the word data sets. In use, as the subject 900 speaks, the speech recognition system is capable of detecting the necessary information in order to generate the synthesized pronunciation signal. The synthesized pronunciation signal may be then outputted by the output device 7 such that other people may be able to understand the content of the speech of the subject 900, even if the subject 900 has dysarthria condition.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A speech recognition system to be used on a human subject, said speech recognition system comprising:
    an image capturing device for successively capturing images of lips of the subject during a speech of the subject;
    an oral cavity detecting device including
        a carrier base configured to be mounted in an oral cavity of the subject at a palate of the subject,
        a contact detecting unit disposed on said carrier base, and configured to detect contact with a tongue of the subject and to generate a contact signal according to the contact with the tongue during the speech of the subject, and
        a distance detecting unit disposed on said carrier base, and configured to detect a distance from the tongue of the subject and to generate a distance signal according to the distance from the tongue; and
    a speech recognition device coupled to said image capturing device and said oral cavity detecting device for respectively receiving the images of the lips of the subject and the contact and distance signals, and programmed to process the images of the lips and the contact and distance signals so as to obtain content of the speech of the subject.

2. The speech recognition system of claim 1, further comprising an output device coupled to said speech recognition device for receiving the content of the speech therefrom and for outputting the content of the speech.

3. The speech recognition system of claim 1, wherein said speech recognition device includes:
    a lip movement analyzing module that stores a plurality of lip parameters associated respectively with different movements of the lips, and that is programmed to analyze the images of the lips for determining which one of the movements of the lips occurs during the speech of the subject, and to obtain a corresponding one of the lip parameters that is associated with said one of the movements of the lips;
    a contact analyzing module that stores a plurality of palate parameters associated respectively with different patterns of the contact with the tongue, and that is programmed to analyze the contact signal for determining which one of the patterns occurs during the speech, and to obtain a corresponding one of the palate parameters that is associated with said one of the patterns;
    a distance analyzing module that stores a plurality of tongue parameters associated respectively with different change patterns of the distance between said distance detecting unit and the tongue of the subject, and that is programmed to analyze the distance signal for determining which one of the change patterns of the distance occurs during the speech, and to obtain a corresponding one of the tongue parameters associated with said one of the change patterns of the distance; and
    a parameter collecting module that is programmed to collect the corresponding one of the lip parameters, the corresponding one of the palate parameters and the corresponding one of the tongue parameters to generate a speech parameter set corresponding to the content of the speech.

4. The speech recognition system of claim 1, wherein said contact detecting unit includes:
    a plurality of spaced-apart pressure sensors that are configured to output pressure detecting signals upon being touched by the tongue, respectively; and
    a signal processor that is configured to process the pressure detecting signals to generate the contact signal.

5. The speech recognition system of claim 1, wherein said distance detecting unit includes:
    a plurality of spaced-apart distance sensors that are disposed on a bottom surface of said carrier base, which faces the tongue when said carrier base is mounted at the palate of the subject, and that are configured to detect distances from the tongue and to output distance detecting signals, respectively; and
    a signal processor that is configured to process the distance detecting signals to generate the distance signal.

6. The speech recognition system of claim 1, wherein said oral cavity detecting device further includes an airflow detecting unit disposed on said carrier base for detecting airflow inside the oral cavity of the subject to generate an airflow signal.

7. The speech recognition system of claim 6, wherein:
    said speech recognition device further includes an airflow analyzing module that stores a plurality of airflow parameters associated respectively with different change patterns of airflow inside the oral cavity of the subject, and is programmed to analyze the airflow signal for determining which one of the change patterns of the airflow inside the oral cavity occurs during the speech, and obtain a corresponding one of the airflow parameters associated with said one of the change patterns of the airflow; and said parameter collecting module further collects the corresponding one of the airflow parameters to generate the speech parameter set.

8. The speech recognition system of claim 1, wherein each of said oral cavity detecting device and said speech recognition device includes a communication unit for transmitting signals therebetween.

9. The speech recognition system of claim 1, wherein said oral cavity detecting device includes a switch unit that, when turned on, transmits an activation command to said image capturing device and said oral cavity detecting device for activating the same to obtain the images of lips of the subject and the contact and distance signals.

10. The speech recognition system of claim 3, wherein said speech recognition device further includes:

a database that stores a plurality of speech parameter sets, and a plurality of pronunciation data sets associated with the speech parameter sets, respectively; and a speech synthesizing module that is programmed to compare the speech parameter set generated by said parameter collecting module with each of the speech parameter sets stored in said database, obtain one of the pronunciation data sets that is associated with one of the speech parameter sets conforming with the speech parameter set generated by said parameter collecting module, and generate a synthesized pronunciation signal from said one of the pronunciation data sets, and wherein said speech recognition system further comprises an output device coupled to said speech recognition device for receiving the synthesized pronunciation signal and for outputting the synthesized pronunciation signal as the content of the speech.

11. The speech recognition system of claim 10, wherein:

said database further stores a plurality of word data sets, each of which is associated with a specific combination of at least one of the pronunciation data sets; and said speech recognition device further includes a word retrieving module that is programmed to retrieve one of the word data sets that is associated with said one of the pronunciation data sets used for generating the synthesized pronunciation signal, and to transmit said one of the word data sets to said output device for output.

12. The speech recognition system of claim 11, wherein said output device includes an audio output module for outputting the synthesized pronunciation signal, and a display module for displaying said one of the word data sets.

13. The speech recognition system of claim 12, further comprising a wearable accessory that includes a main part to be worn by the subject, and an extension part which is connected to and extends forwardly from said main part, said image capturing device and said audio output module being disposed on said extension part.

14. A speech recognition device to be coupled to an image capturing device for receiving images of the lips of a human subject therefrom, and to be coupled to an oral cavity detecting device for receiving a contact signal associated with contact of the oral cavity detecting device with the tongue of the subject during the speech of the subject, and a distance signal associated with a distance of the oral cavity detecting device from the tongue, said speech recognition device comprising:

a lip movement analyzing module that stores a plurality of lip parameters associated respectively with different movements of the lips, and that is programmed to analyze the images of the lips for determining which one of the movements of the lips occurs during the speech of the subject, and to obtain a corresponding one of the lip parameters that is associated with said one of the movements of the lips;

a contact analyzing module that stores a plurality of palate parameters associated respectively with patterns of the contact with the tongue, and that is programmed to analyze the contact signal for determining one of the patterns during the speech, and to obtain a corresponding one of the palate parameters that is associated with said one of the patterns;

a distance analyzing module that stores a plurality of tongue parameters associated respectively with change patterns of the distance between said distance detecting unit and the tongue of the subject, and that is programmed to analyze the distance signal for determining which one of the change patterns of the distance occurs during the speech, and to obtain a corresponding one of the tongue parameters associated said one of the change patterns of the distance; and a parameter collecting module that is programmed to collect the corresponding one of the lip parameters, the corresponding one of the palate parameters and the corresponding one of the tongue parameters to generate a speech parameter set corresponding to content of the speech.

15. The speech recognition device of claim 14, which further receives an airflow signal associated with airflow inside the oral cavity of the subject, wherein, said speech recognition device further comprises an airflow analyzing module that is programmed to:

store a plurality of airflow parameters associated respectively with change patterns of airflow inside the oral cavity of the subject, analyze the airflow signal for determining which one of the change patterns of the airflow inside the oral cavity occurs during the speech, and obtain a corresponding one of the airflow parameters associated with said one of the change patterns of the airflow; and said parameter collecting module further collects the corresponding one of the airflow parameters to generate the speech parameter set.

16. The speech recognition device of claim 14, further comprising:

a database that stores a plurality of speech parameter sets, and a plurality of pronunciation data sets associated with the speech parameter sets, respectively; and a speech synthesizing module that is programmed to compare the speech parameter set generated by said parameter collecting module with each of the speech parameter sets stored in said database, obtain one of the pronunciation data sets that is associated with one of the speech parameter sets conforming with the speech parameter set generated by said parameter collecting module, and generate a synthesized pronunciation signal from said one of the pronunciation data sets, and wherein said speech recognition device is further to be coupled to an output device for receiving the synthesized pronunciation signal and for outputting the synthesized pronunciation signal as the content of the speech.

17. The speech recognition device of claim 16, wherein:
said database further stores a plurality of word data sets, each of which is associated with a specific combination of at least one of the pronunciation data sets; and
said speech recognition device further comprises a word retrieving module programmed to retrieve one of the word data sets that is associated with said one of the pronunciation data sets used for generating the synthesized pronunciation signal, and to transmit said one of the word data sets to the output device for output.

18. A method for speech recognition to be used on a human subject, said method to be implemented by a speech recognition system, the speech recognition system including an image capturing device, an oral cavity detecting device that is to be mounted in an oral cavity of the subject at a palate of the subject, and a speech recognition device coupled to the image capturing device and the oral cavity detecting device, the method comprising the steps of:
successively obtaining, by the image capturing device, images of lips of the subject during a speech of the subject;
detecting, by the oral cavity detecting device, contact with a tongue of the subject and generating a contact signal according to the contact with the tongue;
detecting, by the oral cavity detecting device, a distance from the tongue of the subject and generating a distance signal according to the distance from the tongue during the speech of the subject;
receiving, by the speech recognition device, the image of lips of the subject from the image capturing device and the contact signal and the distance signal from the oral cavity detecting device; and
processing, by the speech recognition device, the images of the lips and the contact and distance signals so as to obtain content of the speech of the subject.

19. The method of claim 18, the speech recognition system further including an output device coupled to the speech recognition device, said method further comprising the step of receiving, by the output device, the content of the speech from the speech recognition device and outputting the content of the speech.

* * * * *